United States Patent
Theuerkauf

[11] 3,829,920
[45] Aug. 20, 1974

[54] TOOL HEAD WITH MULTIPLE TOOLS AND COMMON OSCILLATABLE RECEDE AND COLLAPSE CAM MECHANISM

[75] Inventor: Fred Theuerkauf, Naples, Fla.
[73] Assignee: The Pipe Machinery Company, Wickliffe, Ohio
[22] Filed: July 5, 1973
[21] Appl. No.: 376,308

[52] U.S. Cl............................. 10/96 T, 10/120.5 R
[51] Int. Cl.............................................. B23g 1/22
[58] Field of Search.............. 10/87, 89 R, 94, 96 R, 10/96 T, 120.5 R

[56] References Cited
UNITED STATES PATENTS

| | | | |
|---|---|---|---|
| 1,859,882 | 5/1932 | Nonneman | 10/96 T |
| 2,017,764 | 10/1935 | Mathias | 10/96 T |
| 2,054,028 | 9/1936 | Benninghoff | 10/120.5 R |
| 2,583,094 | 1/1952 | Girz | 10/120.5 R |
| 2,679,057 | 5/1954 | Sawdey | 10/120.5 R |
| 2,795,805 | 6/1957 | Barnes | 10/120.5 R |
| 2,996,736 | 8/1961 | Benninghoff | 10/120.5 R |
| 3,165,768 | 1/1965 | Herbkersman | 10/120.5 R |
| 3,645,638 | 2/1972 | Theuerkauf | 10/120.5 |

*Primary Examiner*—Charles W. Lanham
*Assistant Examiner*—E. M. Combs
*Attorney, Agent, or Firm*—John Harrow Leonard

[57] ABSTRACT

A pipe threading die head supports a plurality of radially reciprocable die carriers in circumferentially spaced relation about a common axis. A cam plate is oscillatable relative to the head about the axis, and has elongated cam slots which are arranged in end to end spaced relation in a row extending circumferentially of the axis. The slots are connected by cam followers to the tool carriers, respectively. The slots are shaped so that, upon rotation of the cam plate relative to the head in one direction at a uniform rate, they first recede all of the carriers concurrently at the same rate of speed away from the axis part way toward their fully receded positions to produce a full depth taper cut, and then recede the carriers at increased rates, to run out and collapse positions. Beginning with the second slot in the series, each slot, during run-out, recedes its associated carrier at a greater rate than the rate of recession of the immediately preceding carrier. The die head and a coaxial pipe supporting chuck are relatively rotated about the axis while driven relatively toward and away from each other end-wise of the rotational axis. A cam maintains the recessions for taper cutting and die run-out to collapsed position in predetermined fixed relation to the relative advance of the head and pipe held in the chuck.

6 Claims, 15 Drawing Figures

TOOL HEAD WITH MULTIPLE TOOLS AND COMMON OSCILLATABLE RECEDE AND COLLAPSE CAM MECHANISM

BACKGROUND OF INVENTION 1. Field of Invention

Metal working machines for cutting tapered screw threads and other tapered surfaces. 2. Description of Prior Art The invention is disclosed herein in connection with the cutting of external tapered threads on pipes and rods, its use for cutting stepped or ustepped internal and external threads and other surfaces, both tapered and of constant diameter, being apparent from the illustrative example.

Benninghoff U.S. Pat. Nos. 2,054,028 of Sept. 8, 1936, and 2,996,736 of Aug. 22, 1961, disclose machines for cutting tapered threads by means of a rotary head which supports a plurality of die carriers for radial reciprocation toward and away from the rotational axis of the head. Suitable recede mechanisms advance and recede the carriers in fixed relation to the advance of the rotating head relative to a length of pipe supported in coaxial relation to the head by a non-rotative chuck. In other machines, the chuck is rotated about the axis of a non-rotative head.

In either case, during the relative advance of the head, the pipe and head are rotated relative to each other, and the carriers for the cutting tools are receded from the rotational axis in fixed relation to the positions of relative advance of the head and pipe. This is accomplished usually by sine bar recede mechanisms controlled by a drive control member driven axially relative to the head by engagement with the end of the pipe.

In U.S. Pat. No. 2,679,057, issued May 25, 1954, to Neil T. Sawdey, the dies are receded gradually and uniformly by a similar sine bar recede mechanism driven in relation to the relative advance of the chuck and head, regardless of the axial position of the pipe.

These sine bar recede mechanisms extend from the head to the rear of the machine and back into the head, and are connected to the carriers, for receding the carriers, by a complicated and expensive chain of interacting parts, all of which must be very precise dimensionally.

In U.S. Pat. No. 3,165,768 of E. C. Herbkersman, issued Jan. 19, 1965, provision is made in a similar type of machine for multiple stages of collapse of the carriers so that stepped threads or other stepped surfaces, whether tapered or constant diameter, can be cut. Such cutting is effected by a gradual and uniform recession of the carriers away from the axis of rotation part way of the length of the workpiece portion being cut, followed by almost instant recession or collapse of the carriers to a new starting position for making a coaxial cut which, at the end contiguous to the trailing end of the original or preceding cut, is of greater diameter than that of the contiguous trailing end.

The present invention has several advantages. The tools or dies, at the end of a taper or cylindrical cut, can be run out of the stock successively, each at progressively increased rates of speed from the first cutter in the set to the last, so as to shorten the circumferential extent of the run-out and thereby provide a full depth thread closer to the end of the cut made by the leading tooth, and thus in closer proximity to any radial shoulder or step that might be desired. The optimum of this approach is for all teeth to run out at the same point circumferentially and axially of the pipe. All of the types of cuts above mentioned, approaching this optimum, can be made with the present much simplified cutting head and its recede and collapse mechanism, and the mechanism can be incorporated in a non-rotating head and rotary chuck combination for threading pipes in a rotary head and stationary chuck combination, or both.

Operations heretofore requiring the expensive machines can be performed as well with the simpler machines, such as lathes, employing the present much more simple and inexpensive recede mechanism fully contained in the present head.

The present invention is directed to accurate recession, run-out, collapse, and reset of a series of individual tools by means of a single oscillatable multi-cam member oscillated by a single external driving cam which can be adjusted to vary the rates of recession, run-out, and collapse relative to the advance of the head, whereby the invention is applicable to the cutting of tapered threads and surfaces throughout a wide range of diameters, degrees of taper, and thread lead, with controlled rapid run-out.

SUMMARY

The invention is directed to cutting tapered surfaces by a plurality of individual tools which are receded concurrently at a uniform rate, each until it is near the end of its cut, and then, successively, running out each tool, beginning in each instance, at a location nearer the end of the cut than its predecessor, and at a faster rate than its predecessor, so that the tools complete their run-out at more nearly the same location axially and circumferentially of the work and the cut is more nearly full depth for its full length.

For purposes of illustration, the invention is described herein as applied to the cutting of threads on pipe, its application to the cutting of other surfaces on pipe and other work being readily apparent from the illustrative example.

Figure 1:
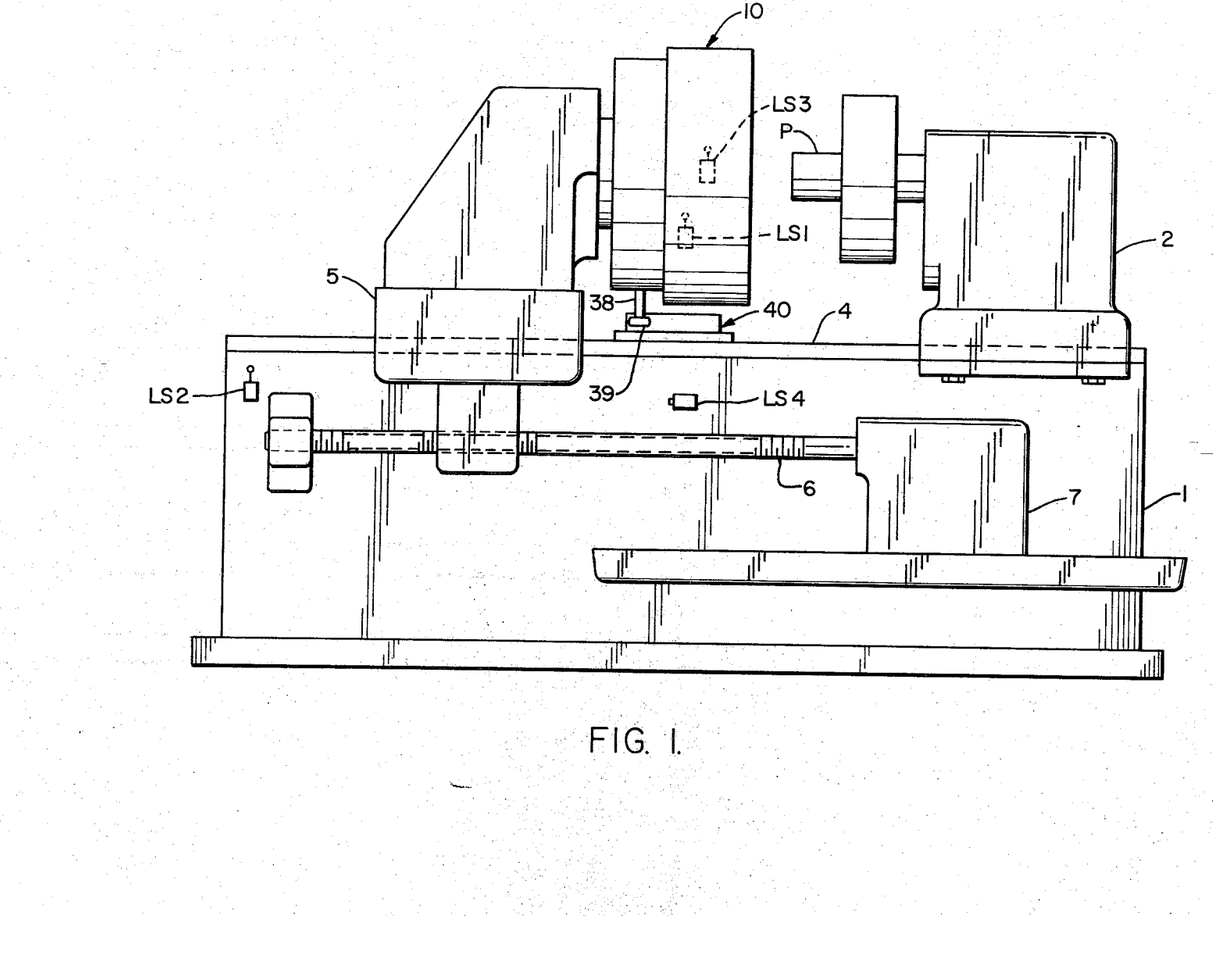
FIG. 1 is a front elevation of a threading machine embodying the principles of the present invention.

Referring first to FIG. 1, the machine is shown as comprising a stationary support or main base 1 on which is mounted a power driven rotatable chuck 2 which supports and rotates a pipe P to be threaded. Mounted on suitable longitudinal horizontal guideways 4 of the support or main base 1 is a die head carriage 5 which is advanced toward the chuck and retracted therefrom by means of a lead screw 6 driven by a suitable motor driven transmission 7. The chuck 2 is secured in a fixed position endwise of the guideways 4, and during the threading operation, the die head carriage 5 is advanced toward, and retracted away from, the chuck. The die head carriage 5 carries a die head 10 which is positioned with its cutting throat coaxial with the axis of the pipe P or workpiece portion to be threaded.

Figure 2:
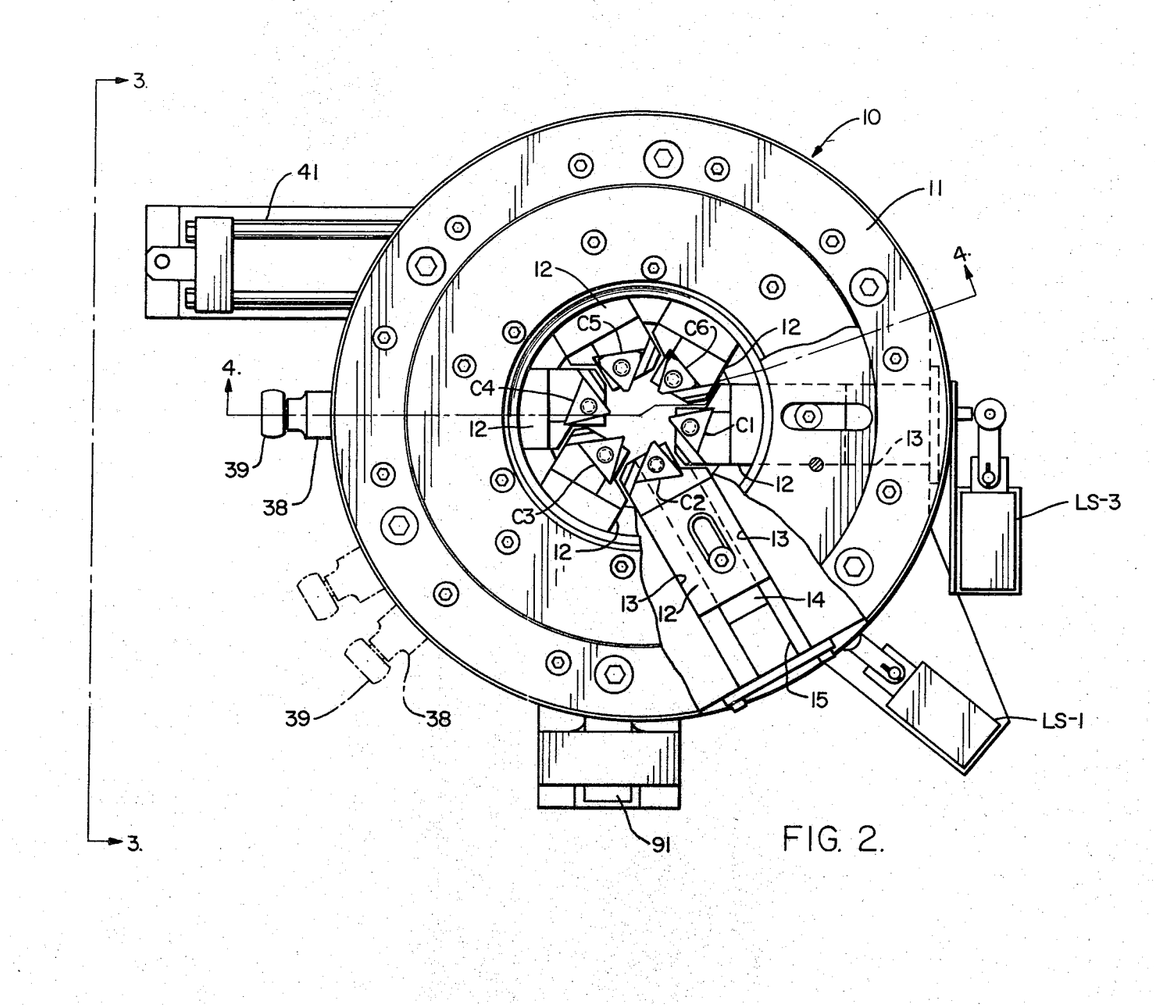
FIG. 2 is an enlarged front elevation of the tool head, of the present invention, used in the machine.
Figure 3:
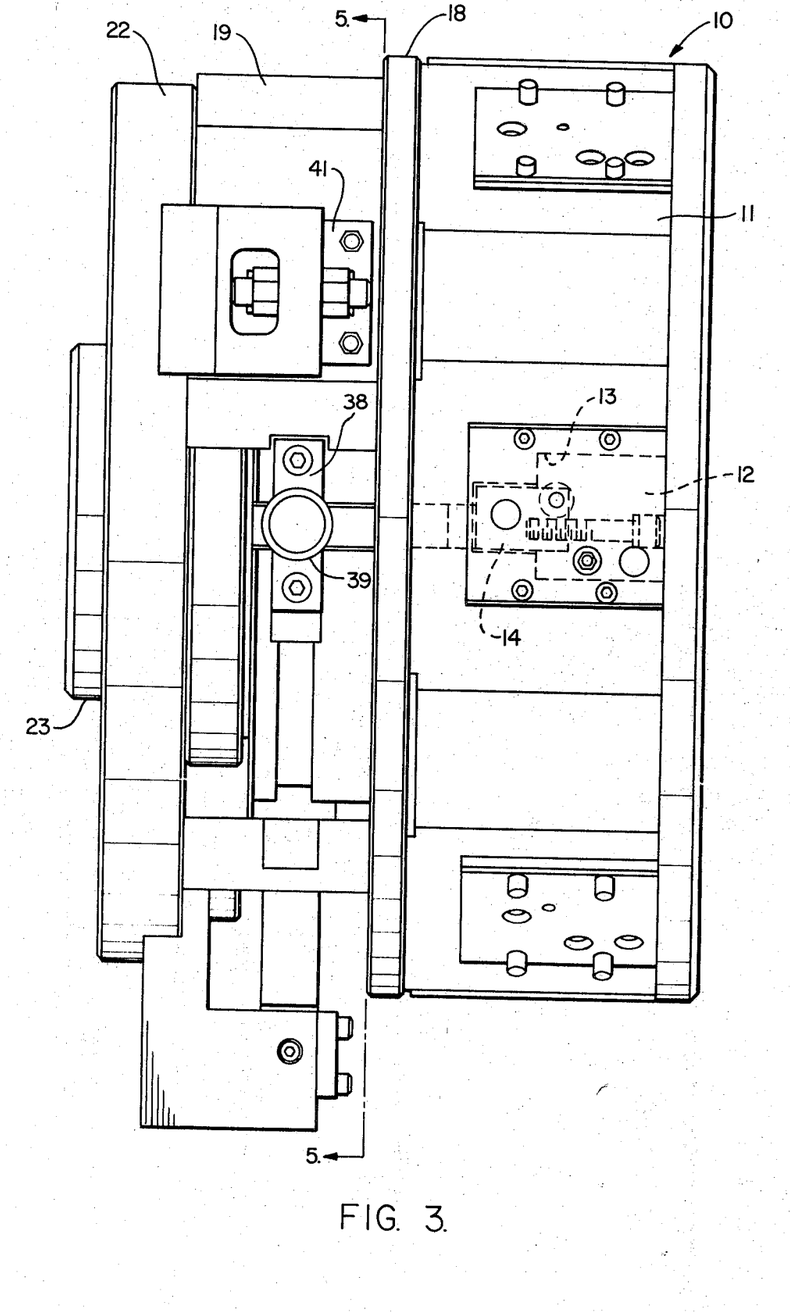
FIG. 3 is a left side elevation of the tool head illustrated in FIG. 2.
Figure 4:
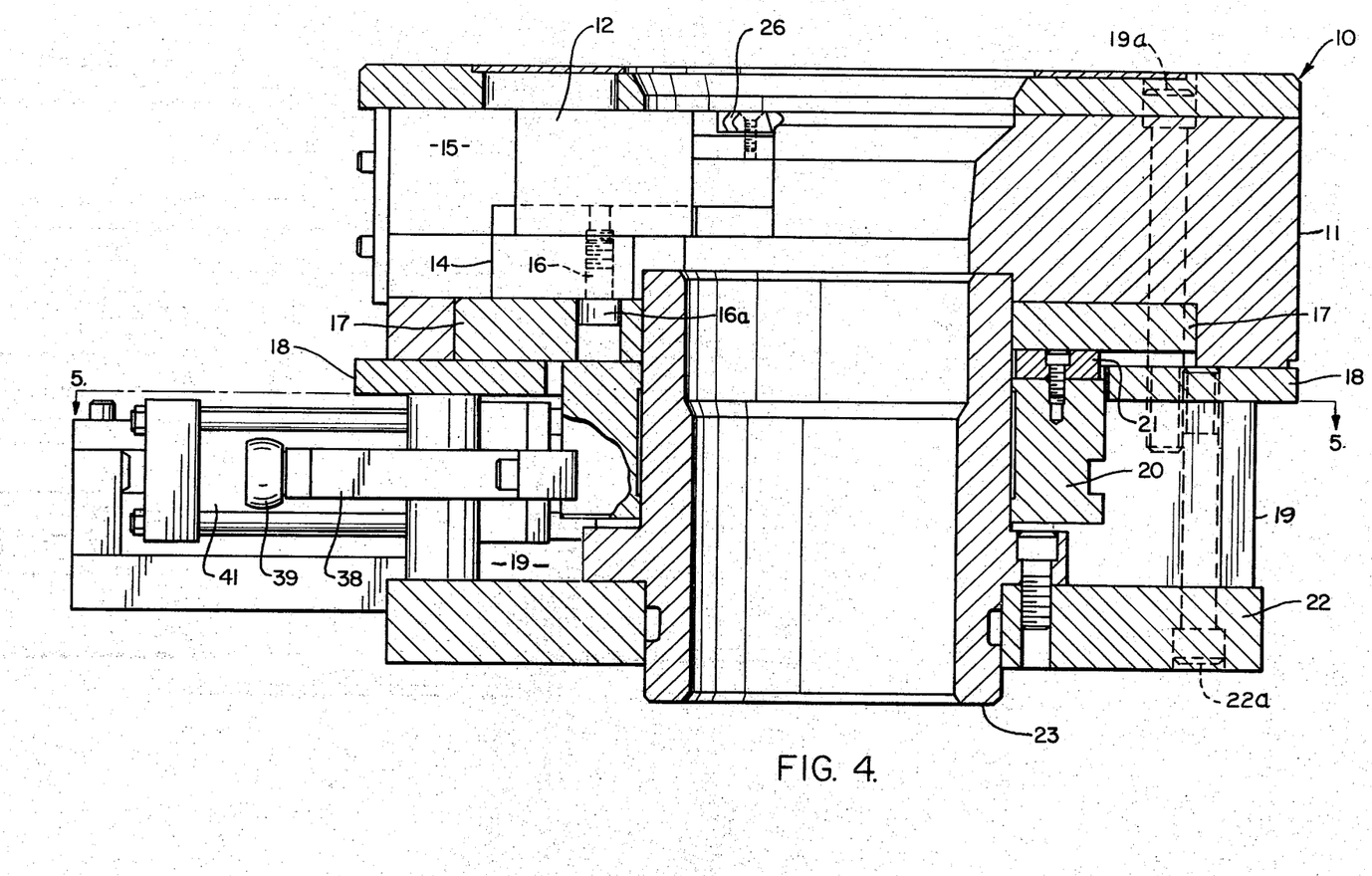
FIG. 4 is a cross sectional view of the tool head, and is taken on the line 4—4 of FIG. 2.
Figure 5:
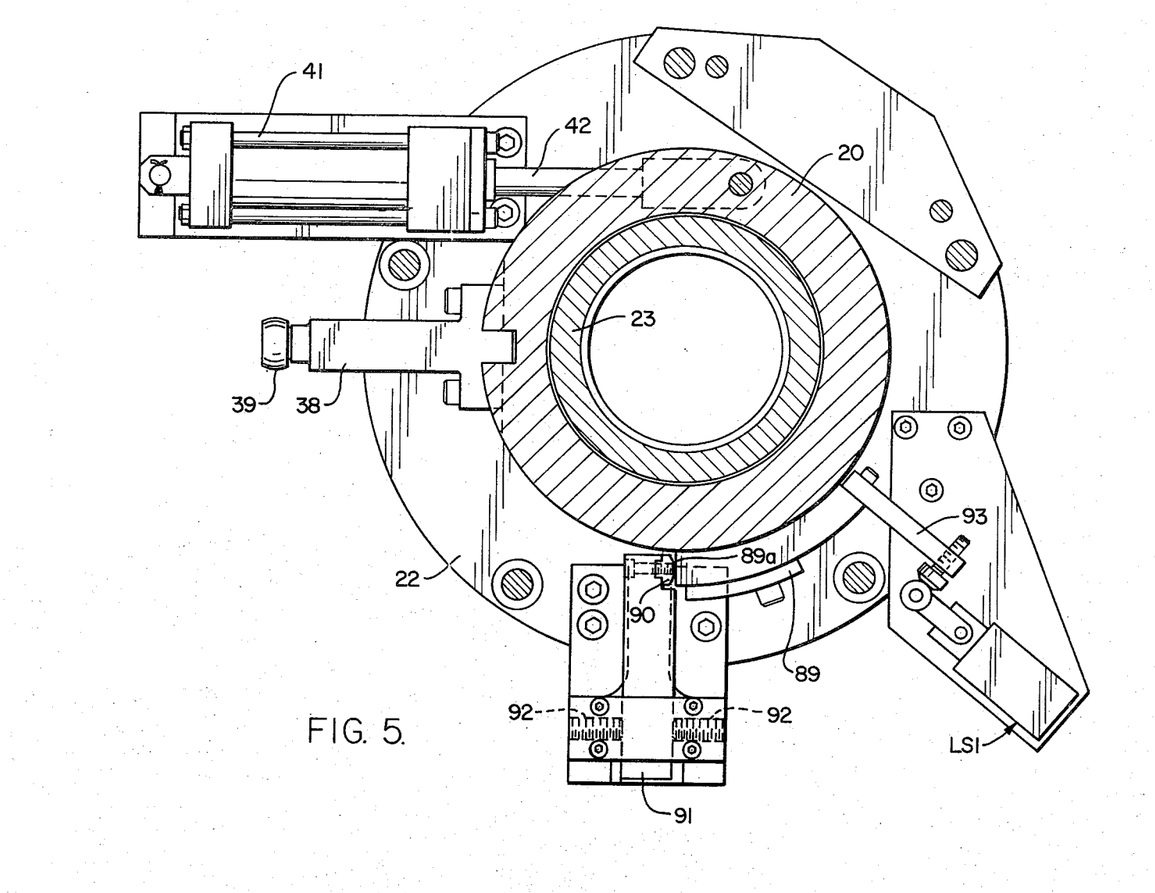
FIG. 5 is a sectional view of the tool head and is taken on the line 5—5 of FIGS. 3 and 4.

The head 10 comprises a body 11 in which a plurality of die carriers 12 are mounted in circumferentially spaced relation to each other about the axis of the cutting throat of the head, in radially extending, circumferentially spaced, guideways 13 for reciprocation radially independently of each other. The carriers 12 are provided with rigid recede blocks 14, respectively, which are reciprocable in guideways 15 which are aligned endwise of the head with the guideways 13, respectively. Each block 14 is rigidly affixed to its associated carrier 12 for reciprocation therewith toward and away from the axis of the cutting throat of the head 10.

For driving the blocks 14, and thereby the carriers 12, toward and away from the axis, each driving block 14 is provided with a cam follower 16, which may be in the form of a pin or bolt in threaded engagement with the block 14. Each follower 16 has a cylindrical head portion 16a which rides on and follows the cam surface of an associated recede and collapse cam plate member 17.

The cam plate member 17 is in the form of an annular plate and is mounted on a pilot sleeve, to be described, in coaxial relation to, and for rotation relative to, the body in opposite directions, selectively. The member 17 is disposed between a rearwardly facing wall of the body 11 and a back plate 18. The plate 18, in turn, is clamped between the body 11 and a rear support plate 19, bolted to the rear end of the body 11 in fixed coaxial relation thereto by bolts 19a.

A cam actuator ring 20 is secured in fixed coaxial relation to the cam plate member 17 by means of a suitable key 21. An adapter plate 22 is secured by bolts 22a against the rear face of the supporting plate 19.

Mounted within and coaxial with the body 11 is a pilot sleeve 23 which, as mentioned, supports and guides the cam plate member 17 and the actuator ring 20 for oscillation. By oscillating the actuator ring 20 in opposite directions, the cam plate member 17 is oscillated through a predetermined angle which, in the form illustrated, is a maximum of about 43°.

In the specific embodiment shown, the carriers 12 carry single tooth tools or dies 26, respectively, the dies being arranged so that they make successively different cuts, respectively, for forming the final thread. Also, in the form illustrated, the dies are mounted on the carriers 12 for cutting an external tapered thread on the pipe P though, by changing the tooling, the head can be used to cut tapered internal threads, or other external and internal surfaces, in which case the cams of the cam plate 17 are modified accordingly in a manner obvious from the description herein.

For driving the carriers 12 through the medium of the cam follower 16, the cam plate member 17 is provided with a plurality of cams in the form of elongated alots in the member 17. These slots are in a series about the axis, one for each carrier 12. In the form illustrated, six carriers 12 are provided. Accordingly, six slots or cams are provided, one for each carrier 12. Each cam is elongated circumferentially of the cam plate member 17. The cams, indicated at 31, 32, 33, 34, 35, and 36, respectively, are arranged in a series in endwise spaced relation to each other in a row extending circumferentially of the rotative axis of the head 10. The cam 31 operates the carrier 12 which carries the first die $C_1$ of a series of dies $C_1$ through $C_6$. The cam 32 operates the carrier 12 for the next successive one of the dies in the series, and so on, the cam 36 operating the carrier 12 for the last of the dies $C_6$ of the series. All of the dies $C_1$ through $C_6$ are moved by the cam plate member 17 concurrently to their proper radial positions relative to the axis for starting of the cut. Upon relative rotation of the chuck and head and concurrent relative lineal advance of the chuck and head carriage 5 toward each other, the dies $C_1$ through $C_6$ are receded from the axis, or their extended positions, concurrently, at the same rate throughout their taper cutting strokes and until they reach their run-out start positions, respectively. During cutting, each die, beginning with the die $C_2$, necessarily cuts deeper than its predecessor, and because it is to complete its run-out radially, as near as can be at the same location circumferentially of the pipe as its predecessor and starting from a deeper cutting position, it must be receded during its run-out at a greater rate than its predecessor. However, each die, beginning from its starting position and continuing to the beginning of its run-out position is to be receded at the same rate as the others. Thus, beginning with the die $C_2$, each die must be run-out at a faster rate than its predecessor, thereby following a steeper run-out path. The shape of the cams 31 through 36, respectively, is such that when the cam plate member 17 is rotated counterclockwise relative to the body 11, in FIG. 6, the carriers 12 are run out in the proper sequence and rate.

Figure 6:
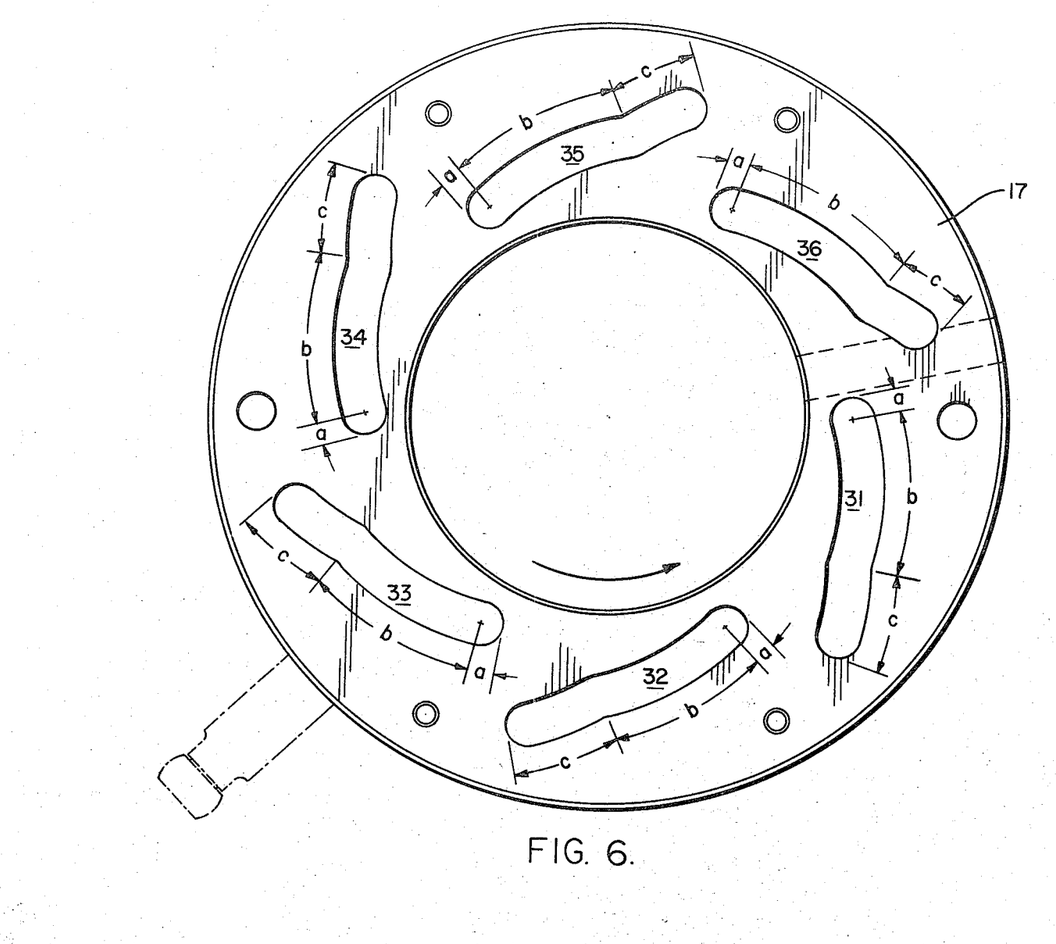
FIG. 6 is a front elevation of the cam plate member forming part of the head illustrated in FIG. 5.
Figure 7:
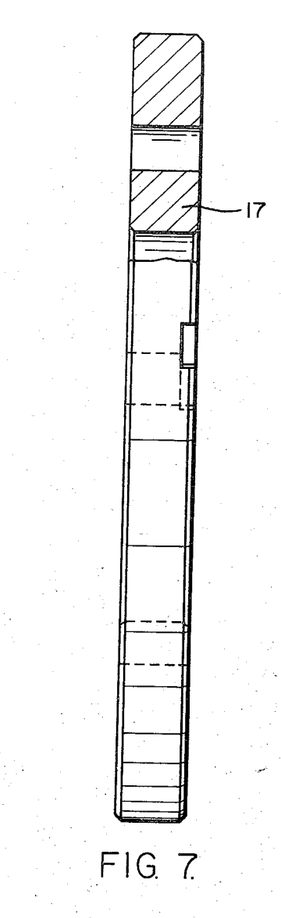
FIG. 7 is a right side elevation of the cam plate member illustrated in FIG. 6.

The cams 31 through 36, in the illustrative example, are in the form of elongated slots in the cam plate member 17. Each cam has a starting portion, indicated at $a$, in which the associated follower head 16a rests in the starting position of the dies $C_1$ through $C_6$. The starting portion is followed by a recede portion, indicated at $b$, which, in turn, connects with a run-out portion, indicated at $c$. The recede portions $b$ recede from the axis of the body 11 at the same uniform rate throughout their lengths, respectively, each starting at the trailing end of its run-out portion $c$. All of the run-out portions $c$, however, recede from the axis at a steeper angle than the portions $b$, and each run-out portion $c$, beginning with the cam 32, recedes from the axis at a greater angle than its predecessor. Accordingly, with the cam head portion 16a of each follower 16 resting in the portion $a$, the corresponding carrier 12 is in a position for holding its die $C_1$ is the proper inwardly extended radial position for starting the cut. As cam follower head portion 16a passes from the starting position a and advances along the recede position $b$, its carrier 12 is receded at a uniform rate of advance of the head 5, until the follower head portion 16a reaches the run-out portion $c$, the follower head portion 16a is receded at a greater rate than the rate at which it was receded in the recede portion $b$ with the same rate of rotation of the cam plate member 17. This greater rate continues until the portion 16a rests in the trailing end of the recede portion $c$ in which position the carrier 12, and its associated die, are in completely collapsed position relative to the axis of the body 11.

It is to be noted that all of the cams 31 through 36 are of the same overall length, and that, beginning with the cam 31, which is the leading cam in the direction of rotation of the cam plate member 17, and continuing in the succession of the cams 32 through 36, the starting portions are the same for all cams, but the recede portions $b$ are progressively longer, and correspondingly, the run-out portions $c$ are progressively shorter. However, because the cams are the same length and all carriers 12 must be receded to fully collapsed position, the run-out portions $c$, beginning with the cam 32, the second of the cams in the series, become successively both shorter and steeper. Thus, the first die $C_1$ is run-out gradually, and each die thereafter is run-out at a greater rate of speed than its predecessor. The run-out positions of all of the dies being close to each other circumferentially and axially of the pipe, each die must travel a greater radial distance than its predecessor to pass from the base of its cut to final run-out position. It is desirable that the thread be as nearly full depth as may be to its very end. This optimum is approached, as mentioned, by making the run-out portions $c$ of the cams successively shorter and steeper in order from the leading cam to the trailing cam of the series.

It is necessary to rotate the cam plate member 17 in fixed relation to the lineal travel of the head 5 relative to the chuck 2. In the illustrative example, the head carriage 5, and thereby the head 10, are moved relative to the chuck 2 which is in fixed position along the lineal path of travel.

In order to rotate the cam plate member 17 in relation to the advance of the carriage 5 toward the chuck 2, along the guideways 4, the cam actuator ring 20 is provided with a radial driving arm 38 on the outer end of which is a cam follower 39. The cam follower 39 is arranged to engage a cam 40 mounted on the support or base 1 in an adjusted position such that, when the head 10 has reached its advanced position for starting the cut, the follower 39 will be in proper driven relation to the cam 40.

Figure 8:
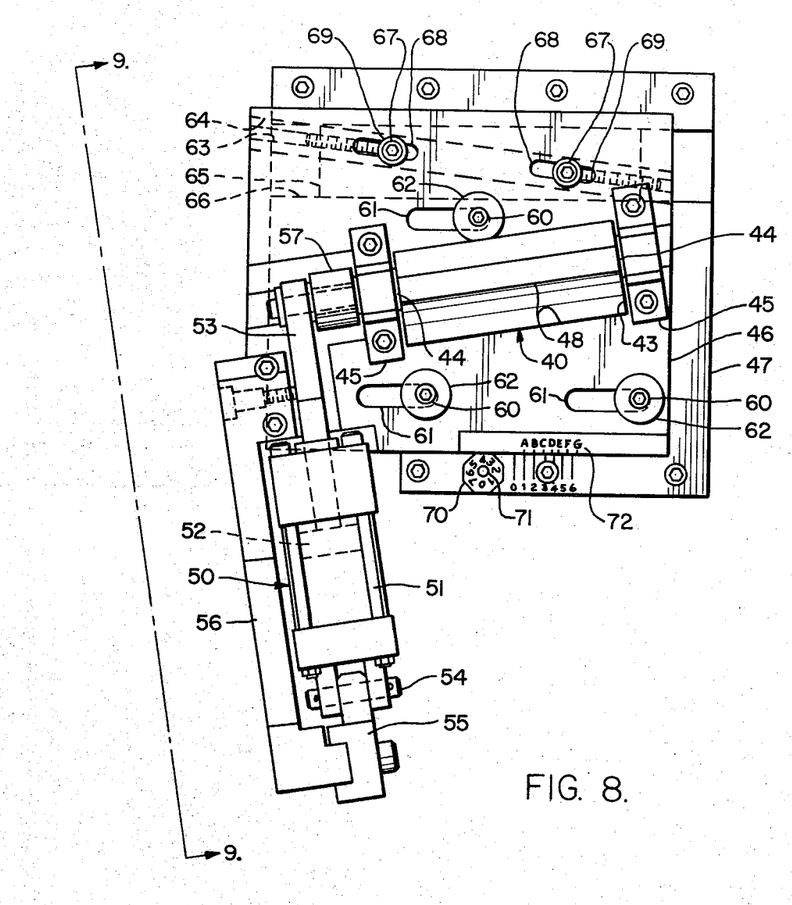
FIG. 8 is a top plan view of the taper control cam for operating the cam plate member to cut stepped threads or surfaces.
Figure 9:
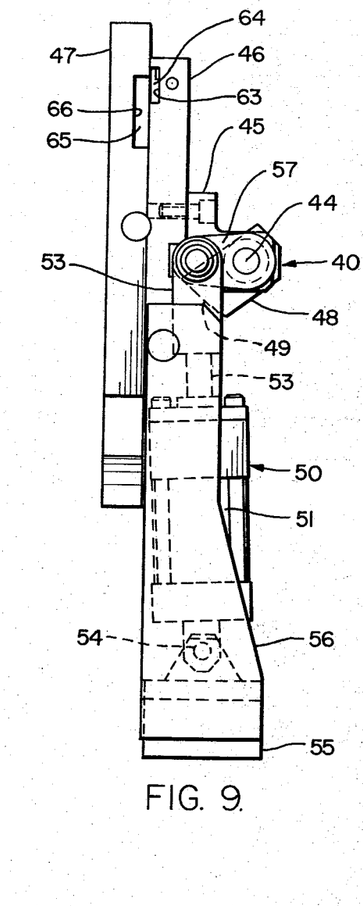
FIG. 9 is a left end elevation of the structure illustrated in FIG. 8.

As best illustrated in FIGS. 8 and 9, the cam 40 has a cam face shaped so that as the carriage 5 of the head 10 advances toward the pipe, the cam arm 38 is swung so as to rotate the cam plate member 17 counterclockwise at a uniform rate relative to the advance of the head carriage 5, this rotation continuing until the end of the tapered cut, run-out, and collapse of the dies.

To eliminate slack and assure precise starting and operating positions of the carriers 12 at all times, the cam plate member 17 is continuously biased in a clockwise direction, or toward the inwardly extended or starting position for the carriers 12. This is accomplished by a reversible set and collapse piston and cylinder assemblage 41 having a rod 42 connected by a clevis to the actuator ring 20. Yieldable fluid pressure is applied to the head end of the piston, as later described herein, so as to urge or bias the complete member 17 in the die set direction which is a clockwise direction, in FIG. 2. This biasing force is in opposition to the force imparted by the cam follower 39 and arm 38 to the cam actuator ring 20, as hereinafter explained.

In some instances, it is desirable to be able to cut stepped threads, and for this purpose the cam 40 is one which has a plurality of cam faces extending endwise of the guideways 4, for cooperation with the follower 39. The cam 40 can be rotated about its axis to present these cam faces, selectively, to the follower 39 at any time during the axial travel of the head carriage 5. These cam faces are chosen for stepping operations in event a stepped type thread or surface is desired.

The cam 40 comprises an elongated body 43 having at its ends coaxial trunnions 44 by which it is mounted for rotation about the axis of the trunnions in suitable bearings 45. The bearings are mounted on an adjustable supporting plate 46 which, in turn, is mounted on a base plate 47. The plate is detachably connected to the support, or base 1 of the spindle head carriage 5 in a suitable location for cooperation of the follower 39 with the cam 40. The body 43 has a low cam face 48 extending longitudinally thereof, and a high cam face 49 also extending longitudinally thereof, and spaced circumferentially of the axis of the trunnions 44 from the low cam face. Generally, for conventional stepped threads, these faces are identical in their camming actions, except one is spaced further from the axis of the trunnions than the other. The cam 40 is positioned on the base 1 of the machine so that the cam faces 48 and 49 extend generally endwise of the lineal path of travel of the die head carriage 5. Each face is arranged so that, when in operating position, its causes uniform rotation of the cam plate member 17 in a counterclockwise direction in fixed relation to the lineal travel of the die head carriage 5 toward the chuck or pipe, while permitting gradual carrier recede, selected for the taper required for the final thread. Thus, beginning at the end of the pipe, the taper thread is produced by gradual recession of the carriers 12 as the head 10 is advanced partway along the length of the pipe. If an abrupt step-out to a thread having a starting diameter greater than the finish diameter of its predecessor is desired, the cam body 43 is rotated so as to present the high cam face 49 of the cam followers 39, thereby resuming the same taper beginning with the larger diameter than the maximum diameter of the first thread of the stepped thread.

In order to rotate the cam 40 for shifting from low face 48 and the high face 49 to operating positions, selectively, a suitable piston and cylinder assemblage 50 is provided. This assemblage comprises a cylinder 51 in which is reciprocably mounted a piston 52 having a piston rod 53. The cylinder is swivelly connected by a pin 54 to a connector 55 secured in fixed position relative to the adjustable supporting plate 46. The piston rod 53 is connected to a crank arm 47 which, in turn, is keyed to one of the end trunnions 44 of the body 43. This piston and cylinder assemblage 50 is of the reversible type so as to rotate the body 43 to either position about the axis of the trunnions and return.

For mounting the supporting plate 46 on the base plate 47 for adjustment universally in the plane of the plates, the plate 46 is secured on the plate 47 by means of suitable bolts 60 operating in the elongated slots 61, the slots being somewhat wider than the bolts 60 so as to permit adjustment of the plate 46 endwise of the slots and transversely thereof. Clamping washers 62 are interposed between the heads of the bolts 60 and the upper face of the plate 46. The plate 46 is provided with a cam slot 63 which opens on its under face and extends on a bias to the lineal path of movement of the spindle head. A cam bar 64 is slidably mounted in the slot 63 and is secured on a carrier bar 65. The carrier bar 65 is slidable endwise in a longitudinal groove 66 in a base plate 47. Thus upon movement of the bar 65 in opposite directions longitudinally in its groove 66, the supporting plate 46 is adjusted forwardly and rearwardly transversely of the lineal path of the die head carriage 5 by the cam bar 64. The bar 64 and the plate 46 are held in the exact position by suitable bolts 67 which extend through elongated slots 68 in the plate 46 and the cam bar 64. Suitable washers 69 are interposed between the bolt heads and the top face of the plate 46.

The amount to which the head is adjusted transversely of the lineal path of the die head carriage 5 may be controlled by a suitable indicating abutment plate 70. The plate 70 is secured by a bolt 71 to the base plate 47. The plate 70 is adjustable about the axis of the bolt 71, and each is so positioned that, when it is disposed toward the edge of the plate 46, it is parallel to the lineal path of the die head carriage 5.

A Vernier scale 72 is provided for indicating precisely the position of the plate 46 endwise of the path of travel from the die head carriage 5.

The piston and cylinder assemblage 50 is of the reversible type and is controlled by a conventional limit switch positioned along the path of travel of the die head carriage 5 in a position dependent upon the location at which the step in the thread is to occur. By selecting cams with additional faces, any number of steps can be provided.

Figure 12:
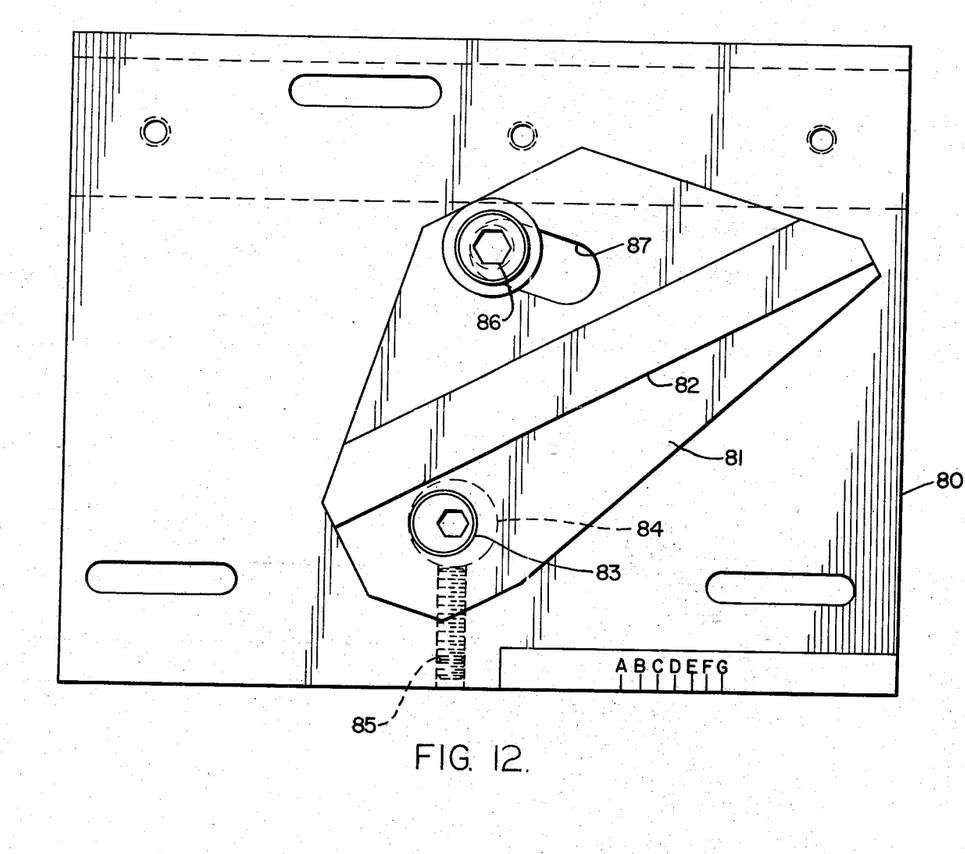
FIG. 12 is a top plan view of a taper control cam for operating the cam plate member to cut threads of continuous uninterrupted taper.
Figure 13:
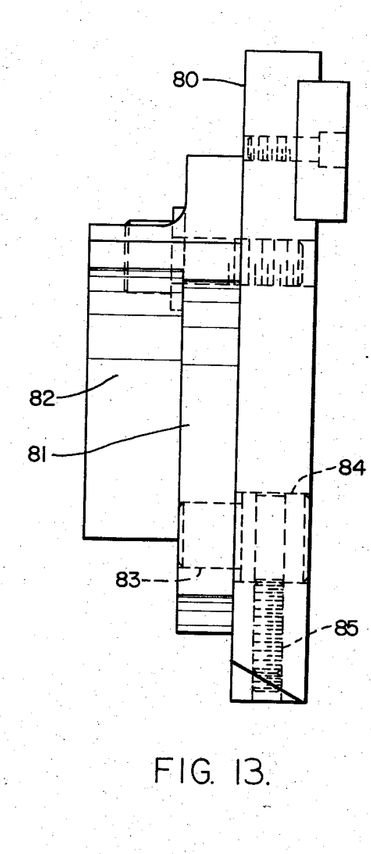
FIG. 13 is a right side elevation of the cam illustrated in FIG. 12.

If, on the contrary, the conventional thread of uniform taper throughout its length is to be provided, then, instead of the cam just described, a cam shown in FIGS. 12 and 13 may be employed. This cam comprises a supporting plate 80, corresponding to the plate 46 heretofore described, mounted in like manner for adjustment relative to the base plate 47. The cam 81 has an operating cam face 82 which is biased relative to the lineal path of the die head carriage 5, as described in connection with the cam 40. In addition to the adjustable supporting plate 80 being mounted for adjustment on the base plate 47, the cam 81 itself is adjustable. For this purpose, the cam is supported on a pivot 83 normal to the plate 80 for swinging about the pivotal axis to selected adjusted positions. The pivot 83, in turn, is mounted on a pivot 84 which is rigid with, and eccentric to, the pivot 83. The pivot 84 is rotatably mounted in the supporting plate 80. By rotating the pivot 84, the pivot 83 is shifted forwardly and rearwardly transversely of the lineal path of the die head. It may be secured in this position by suitable lock bolt 85. The cam 81 is held firmly in the adjusted position on the supporting plate 80 by a bolt 86 extending through an elongated slot 87 in the cam 81.

Figure 10:
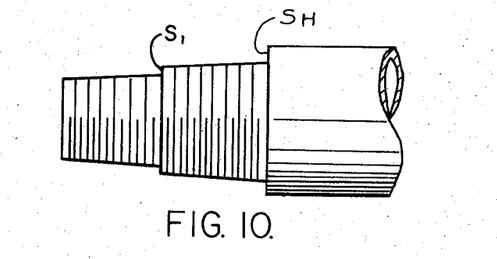
FIG. 10 is a diagrammatic illustration of the end portion of a pipe illustrating a type of cut made with the present machine.
Figure 11:
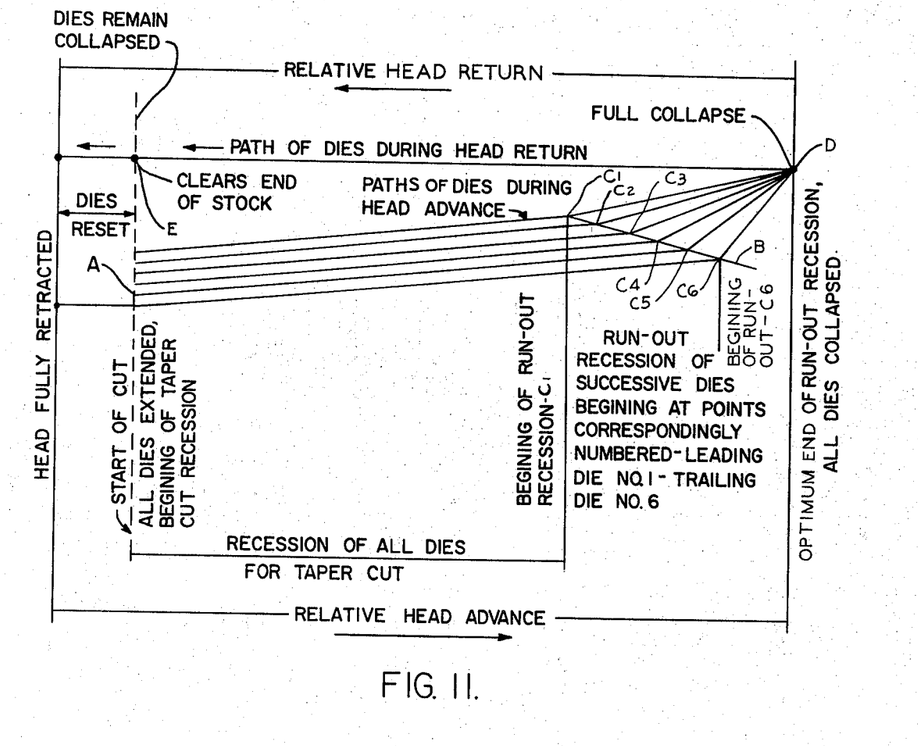
FIG. 11 is a diagram illustrating one sequence of operations of the tools of the present invention.

Referring next to FIGS. 10 and 11, the operations to be performed for cutting an unstepped tapered thread, such as from S to a shoulder Sh, are diagrammatically illustrated.

It is assumed that the head 10 moves from left to right to advance toward the chuck, which is rotatable and which rotates the pipe clockwise when viewed from the end of the pipe so that relative rotation of the head, as viewed in FIG. 2, is counterclockwise.

Starting with the head in the position indicated at A, with the dies set in starting position at step S', the head 10 proceeds to the right, and by cooperation of the cam with the cam follower 39, the diameter of the thread is gradually increased to provide the uniform taper. This taper cutting is continued until the beginning of the run-out of the dies, as indicated by line B. Here it is seen that the cams 31 through 36 are of equal overall length, and beginning with the cam 32, the portions $b$ are successively longer from the leading cam to the trailing cam, and the run-out portions $c$ are successively shorter. This is indicated by the line B which shows that the dies $C_2$–$C_6$ begin their run-outs at progressively greater distances from the beginning of run-out of the first die $C_1$. Each of the dies $C_1$–$C_6$, therefore, continues its full depth of cut progressively nearer to the end of the thread. Optimally, all dies would complete their respective run-outs at the same axial and circumferential point on the pipe, indicated at D, instead of at points distributed circumferentially and axially of the pipe.

In prior practice, the points of run-out are uniformly distributed along the pitch of the thread at angular relations along the spiral such that the total angle from the run-out of the first cutter to the run-out of the last may be several complete revolutions; for example, between 720° and 1,080°. When the thread is to terminate at an abrupt shoulder, this is highly objectionable. Even so, a total run-out angle of 360° has been considered highly acceptable. Refinement is directed to decreasing the distance, along the thread, between the run-out point of the die $C_6$ and the run-out point of the die $C_1$ as near to zero as possible.

In the illustration, all cutters are shown as completing their run-outs optimally at the same point D, and this can be accomplished, but with risk of imposing an overload on the last one or two dies. However, a total run-out angle of substantially less than 360° is readily obtainable and, at reasonable working speeds, the danger of tool breakage by overload, or by failure to clear the shoulder Sh, is substantially eliminated and a thread with such a total run-out angle is considered excellent. The limitation on the steepness of the run-out is usually directly related to to the load that can be withstood by the last die $C_6$, and indirectly to the height of the shoulder Sh.

If a stepped thread is desired, the body 43 of the cam 40 is rotated to present the high operating face 49, to the cam follower 39, when the axial position for the step S is reached. The portion of the thread cut from the end of the pipe to the step S is uniformly tapered to a predetermined diameter, then, due to the stepping effect, it is recommenced at a starting diameter greater than the maximum diameter of the thread already cut at S. Proceeding after the rotation of the cam 40, the head moves to the right, and a thread on the same degree of taper as that up to the step S is produced. This continues, for example, from stations A to B, in FIG. 11, the carriers 12 uniformly receding to provide the taper, until each carrier reaches its preselected run-out start position at B, as heretofore described. Thereupon, due to the run-out portions c of the cams 31 through 36, in succession, the die is fully run out to fully collapsed position at D which is the same for all dies.

After the dies reach the position in which they have been fully receded to collapsed position, they are held in the collapsed position during the return of the head to the left until they are clear of the end of the pipe, indicated at E.

At some point between the retracted position of the head 10, between the position E and the starting position A, the cam plate member 17 is rotated to reset the dies for starting the next cut. To reset, the pressure fluid supplied to the piston and cylinder assemblage 41 is reversed by a limit switch, operated by the carriage 5, thus rotating the cam plate member 17 in the direction in which it is normally biased, and opposite to the direction in which it is rotated by the cam 40. This applies the follower 39 to the cam 40, and the carriers 12, and dies, are held in this starting position, awaiting the initiation of recede by the cam.

The collapse of carriers 12 is controlled by a limit switch LS3 which is carried by the body 11 in position to be engaged by one of the carriers 12 when the selected carrier has been moved radially outwardly to a predetermined position. For example, the limit switch LS3 can be tripped by the last carrier 12 of the series when the last carrier has completed its run-out.

The die reset is controlled by operating a push button, as later described. For indicating that the dies and carriers 12 are properly reset, the cam plate member 17 carries a circumferentially adjustable member 89 having an abutment shoulder 89a positioned to engage a fixed stop 90, which may be set for fine adjustment, is used for cylindrical threads. The stop 90 is supported on a fine adjustment lever 91 pivotally carried by the body 11. The lever 91 is held firmly in selected adjusted position about its pivot by suitable set screws 92. The adjustment member 89 carries a trip arm 93 which, when the adjustment 89a and stop 90 are engaged, trips a limit switch LS1. In the form illustrated, tripping of the limit switch LS1 lights a signal light L, to indicate that the dies are reset in proper starting position.

Figure 14:
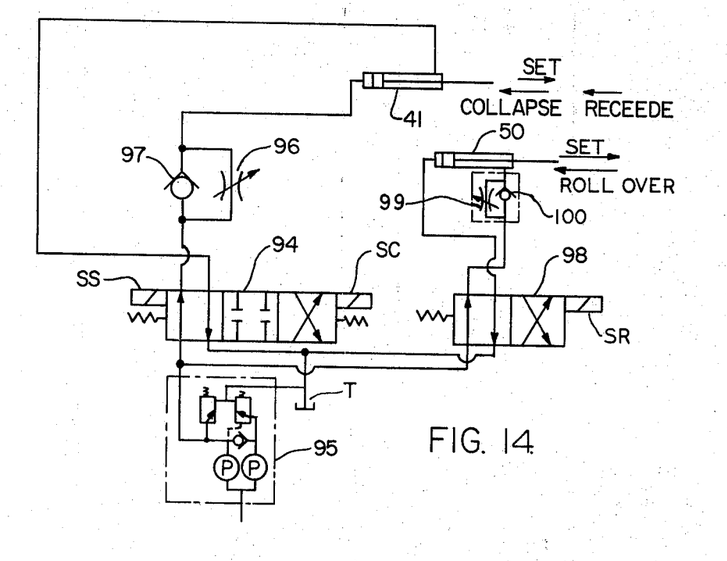
FIG. 14 is a hydraulic diagram showing the hydraulic driving mechanisms in the present invention.

The hydraulic system for effecting these operations includes normally centered stop and reversing main valve 94, connected to a source of pressure fluid 95, shown as two pumps P with integral relief valves.

The valve 94 may be set in an OFF position in which all flow through the circuit is blocked. The valve 94 is set in the die set position illustrated by the solenoid SS and in the die collapse position by a collapse solenoid SC. When the valve 94 is in the die set position, pressure fluid is supplied to the head end of the piston and cylinder assemblage 41 through a metering or throttling valve 96 and rotates the cam plate member 17, clockwise in FIG. 2, toward starting position of the dies, at a controlled rate, until the abutment 89a strikes the stop 90.

Upon recede of the dies, due to rotating the cam plate member 17 counterclockwise by the cooperation of the cam 40 and the follower 39, the piston of the piston and cylinder assemblage 41 is driven to retracted position, thus forcing the pressure fluid from the head end of the assemblage 41 back toward the metering valve 96. A by-pass circuit is provided around the metering valve 96 and includes a check valve 97 which opens to permit the free flow of pressure fluid from the head end of the assemblage back to and through the integral relief valves of the pumps P, and to a tank T. This arrangement provides yielding resistance to rotation of the cam plate member 17 in the direction of recession of the dies and assures firm contact between the follower 39 and cam 40. This yieldable resistance continues until the last of the dies in the series is fully receded and run out, whereupon the valve 94 is reversed. Reversal of the valve 94 causes pressure fluid to be supplied to the rod end of the assemblage 41, and concurrently connects the head end of the assemblage directly to the sump or tank T. As a result, the full collapse is substantially instantaneous and the dies are held in collapsed position until the valve 94 is again reversed for setting them.

If the roll type of cam is to be used, then its roll-over piston and cylinder assemblage 50 is connected to the pressure source 95 through a reversing valve 98. When the reversing valve 98 is in the position illustrated, it supplies pressure fluid to the rod end of the roll-over piston and cylinder assemblage 50 through a throttling or metering valve 99, and thus operates the assemblage in the direction for rolling over the cam 40. During the roll-over, the head end of the assemblage 50 is freely vented to the tank T. Upon reversal of the valve 98, pressure fluid is supplied to the head end of the assemblage 50 and the rod end is vented in by-passing relation to the metering valve 99 through a check valve 100, and thence through the integral relief valves of the pumps P of the source 95 to the tank T. The resultant differential in hydraulic pressure on the piston of the assemblage 50 drives the piston thereof to extended position and thus drives the roll-over chuck to its original set position for starting a new thread against the yielding pressure in the rod end of the assemblage.

In order to effect these operations, an electrical circuit, such as illustrated diagrammatically in FIG. 16, is provided. As there illustrated, a normally open starting push button 101 is provided and is connected across power lines $L_1$ and $L_2$, in series with, and between, the coil of a control relay CR-1 and a normally open limit switch LS2. The limit switch LS2 is closed when the carriage 5 has been moved to its fully retracted position relative to the chuck. In this condition, closing of the push button energizes the control relay CR-1, closing its normally open control contacts CR-1A and CR-1B and opening its normally closed contacts CR-1C. Closure of the normally open contacts CR-1A energizes the die set solenoid SS for setting the valve 94 in the position, illustrated in FIG. 15, to set the dies in starting or set position. Closure of the normally open contacts CR-1B establishes a holding circuit through normally closed contacts 3B of a limit switch LS3, for maintaining energization of the coil of control relay CR-1 after the push button 101 opens. In this condition, the dies are moved to set position. A normally open limit switch LS1 is closed by the arm 93 when the cam plate member 17 reaches set position as established by the stop 90, and 1 lights the signal light L to indicate that the die head is completely set. The drive is then operated to advance the head 10. During the advance, the dies are receded by coaction of the member 17 and cam 40, until the LS3 is tripped by its selected carrier 12. Tripping of the limit switch LS3, opens the normally open contacts LS3B, breaking the holding circuit around the push button 101 and deenergizing the control relay CR-1. Thereupon the normally closed contacts CR-1C of the relay CR-1 reclose. Concurrently, the tripping closes the normally open contacts LS3A and thereby energizes the die collapse solenoid SC through the now closed contacts CR-1C. This shifts the valve 94 so that it causes the assemblage 41 to retract and fully collapse the dies.

At the end of the feed stroke and while the dies are collapsed, the drive of the carriage is reversed by a manual switch for returning the carriage 5 to the retracted position relative to the chuck.

Figure 15:
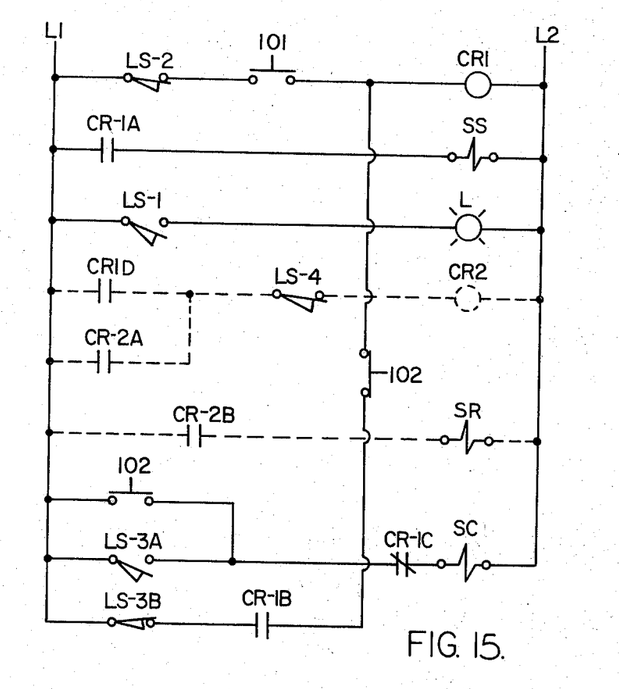
FIG. 15 is a wiring diagram showing the electrical control system of the present invention.

If the roll-over cam 40 is to be used, the circuitry indicated in dotted lines is incorporated. Thus, upon energization of the control relay CR-1, its normally open contact CR-1D is closed, and causes energization of the coil of the control relay CR-2 through a normally closed limit switch LS-4. At this time, the roll-over cam 40 is in its high position for the larger diameter stepped thread. Energization of the coil CR-2 closes its normally open contacts CR-2A to establish a holding circuit and, concurrently, closes its normally open contacts CR-2B. Closure of the contacts CR-2B energizes the solenoid SR of the valve 98 to effect resetting of the roll-over cam 40 to starting or low position. The limit switch LS4 is opened by the carriage 5 when it retracts beyond the position to which it must advance to close limit switch LS4, so that the cam 40 remains in low position until the carriage 5 is advanced to the stepping position. Thereupon the carriage 5 is returned to starting position and ready for a second threading cycle upon closure of the push button 101.

An emergency collapse push button 102 is provided and has a normally closed side and a normally open side. It is connected so that its normally closed side is in the holding circuit of the coil of control relay CR-1, and its normally open side is in a by-pass circuit by-passing the normally open limit switch contacts LS-3A. Thus, by pressing the push button 102, the coil of the control relay CR-1 can be deenergized, thus deenergizing the entire circuit. At the same time, the normally open contacts of the push button 102 are closed and thereby, through the normally closed contacts CR-1C, energize the collapse solenoid SC. Thus, in an emergency, the machine can be stopped and with the dies moved into fully collapsed position.

Having thus described my invention, I claim:

1. An apparatus for making tapered cuts on a workpiece, comprising:
a cutter head including a body;
a plurality of cutting tool carriers mounted on the body in spaced relation to each other circumferentially of a common axis and each for guided movement relative to the body toward and away from said axis;
a cam member mounted on the body for rotation relative thereto about said axis;
a plurality of cams on the cam member, one for each carrier, and drivingly connected to the carriers for driving the carriers concurrently generally radially in opposite directions relative to said axis to extended and collapsed positions, respectively;
drive means to drive the cam member in said opposite directions, selectively;
characterized in that:
each cam has a carrier recede portion for receding its associated carrier at a predetermined rate relative to the rate of rotation of the cam member in one of said directions, and a carrier run-out portion for receding its associated carrier at a rate greater than said predetermined rate relative to said rate of rotation of the cam member in said one of said directions, and the recede portion leads the run-out portion in said one of said directions of rotation of the cam member.

2. The structure according to claim 1 and further including:
a chuck;
means supporting the body and chuck for rotation relative to each other about said common axis, and for lineal movement relative to each other along a path parallel to said axis in one direction from a starting position to a predetermined advanced position, and in the opposite direction from said advanced position to said starting position;
power means for effecting said relative rotation and lineal movement concurrently in fixed relation to each other;
said drive means including a carrier receding drive operative to rotate said cam member, in the one of its directions of rotation for receding the carriers, in predetermined fixed relation to said relative lineal movement of the body and chuck toward advance position during their relative rotation, to a predetermined rotated position;
means to hold said cam member in its said predetermined rotated position beginning upon completion of the full recession of the carriers and continuing during return of the body and chuck lineally to their relative starting position, and to rotate said cam member in the one of its directions for extending the carriers to an oscillated starting position prior to the body and chuck being moved into said starting position;
further characterized in that:
said drive means includes a step cam element and a cam follower element, one of said elements being mounted on the cam member for rotation therewith, and the other of said elements being supported in a predetermined position along said lineal path;
said step cam element being mounted for movement to a plurality of operating positions, and having a plurality of cam faces positionable for engagement with the follower, respectively, by movement of the step cam element to said operating positions, respectively, and operable, when engaged with the follower element, to impart different rates of rotation of the cam member relative to rate of travel of the body and chuck relatively toward each other; and
power means for moving the step cam element to said operating positions, selectively.

3. An apparatus according to claim 1 wherein the recede portions of the cams, in order, beginning with the next to the leading cam in said one direction of rotation and continuing to the last cam trailing in said one direction of rotation, each being successively longer than its immediate predecessor.

4. An apparatus according to claim 1 wherein the run-out portions of the cams, in order, beginning with the next to the leading cam in said one direction of rotation and continuing to the last cam trailing in said one direction of rotation, each being successively shorter and steeper than its immediate predecessor.

5. An apparatus according to claim 1 wherein the combined length of the radial components of the recede and run-out portions of each cam is equal to the combined length of the radial components of the recede and run-out portions of each of the other cams.

6. The structure according to claim 2 wherein said recede drive means includes a cam follower on, and rotatable with, the cam member;

a complementary cam supported in fixed position along said lineal path;

a reversible piston and cylinder assemblage including a piston movable to extended and retracted positions, respectively, and connected to the cam member so that it is in one of said positions when the cam member is in the rotated position in which it holds the carriers in fully receded positions, and it is in the other of said positions when the cam member is in the rotated position in which it holds the carriers in their radial starting position.

* * * * *